UNITED STATES PATENT OFFICE.

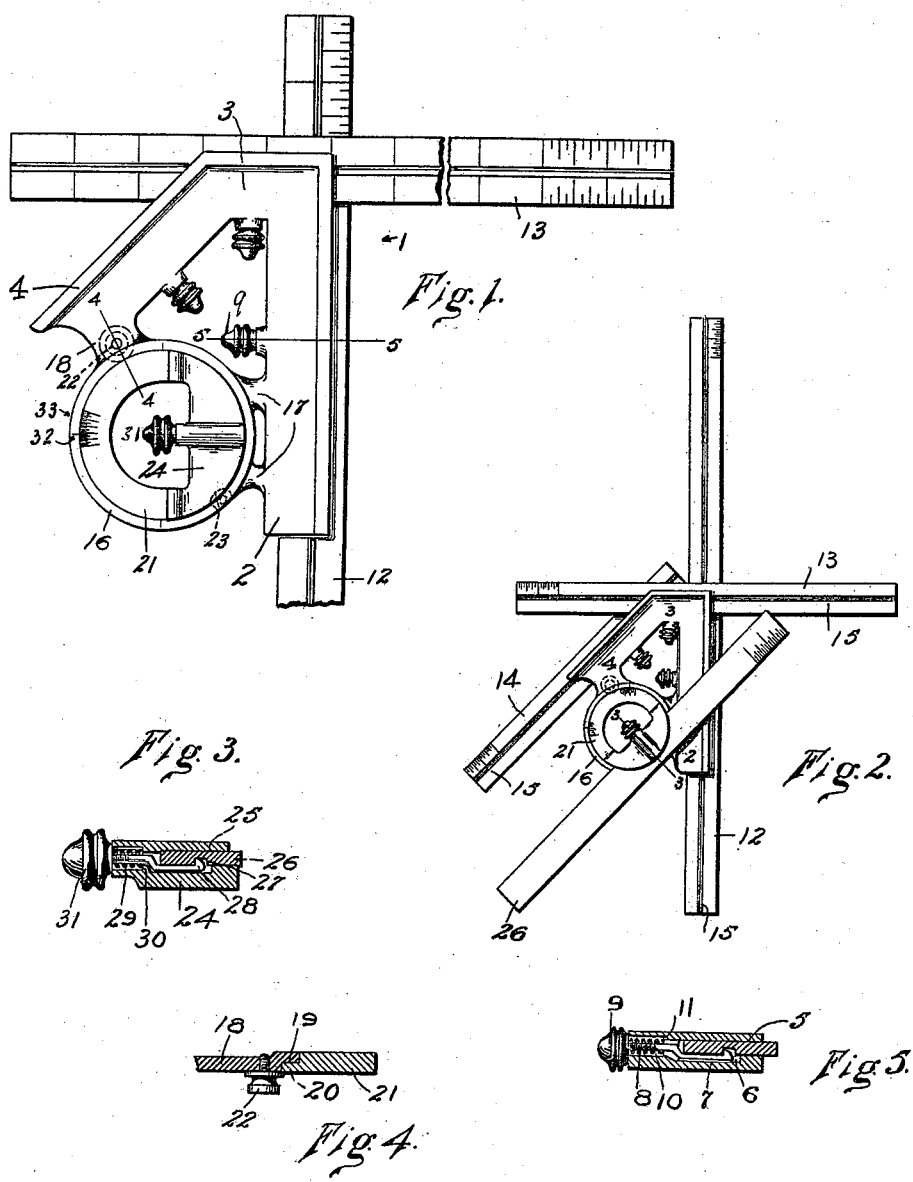

GEORGE HENNIGAR AND ROY TENEYCK, OF NORTH LANSING, MICHIGAN.

SQUARE AND PROTRACTOR.

975,036.

Specification of Letters Patent.

Patented Nov. 8, 1910.

Application filed December 21, 1909. Serial No. 534,272.

*To all whom it may concern:*

Be it known that we, GEORGE HENNIGAR and ROY TENEYCK, citizens of the United States, residing at North Lansing, in the county of Ingham and State of Michigan, have invented certain new and useful Improvements in Squares and Protractors, of which the following is a specification.

Our invention relates to a device adapted to fulfil the functions of a square, protractor and bevel.

An object of our invention is to provide a device embodying means for holding two blades at right angles to each other, said blades being adjustable longitudinally for the purpose of taking and transferring measurements.

The final object of our invention is to provide a device of the above character, which will be simple in construction, easy to operate, and cheap to manufacture.

Our invention consists generally in the arrangement and combination of parts to be hereinafter described.

In the accompanying drawings forming a part of this specification, and in which like numerals are employed to designate like parts throughout the same, Figure 1 is a side view of our device, some of the blades being removed. Fig. 2 is a similar view of our device equipped with all the blades. Fig. 3 is a sectional view taken on the line 3—3 of Fig. 2. Fig. 4 is a similar view taken on the line 4—4 of Fig. 1. Fig. 5 is a similar view taken on the line 5—5 of Fig. 1.

In the preferred embodiment of our invention as illustrated in the drawings, 1 designates a head-stock or body portion of the device. The body portion comprises an arm 2, at one end of which and at right angles thereto is formed a short arm 3. An arm 4 is formed upon the free end of the arm 3 and is arranged at an angle of 45 degrees to said arm 3. The arms 2, 3 and 4 are provided upon their outer edges with grooves 5 which are disposed in different planes and adapted for the reception of blades to be hereinafter referred to. Each of the arms 2, 3 and 4 is provided at its longitudinal center with a transverse opening 6 within which is movably mounted a hook member 7, the free end of which is disposed within the opening 5. The hook member 7 is screw threaded as at 8 for the reception of a thumb nut 9, and a coilspring 10 surrounds the screw threaded portion 8 and is compressed between the thumb nut 9 and a shoulder 11.

Blades 12, 13 and 14 respectively are disposed within the openings 5 upon the arms 2, 3 and 4, and each of said blades 12, 13 and 14 are provided with corresponding longitudinally arranged grooves 15, which receive the free end of the hook member 7, as illustrated in Fig. 5. It is to be understood that the blades 12, 13 and 14 are to be inserted within their respective openings 5 by a longitudinal movement of the same.

By reference to Fig. 5 it is obvious that the blade arranged within the opening 5 is frictionally engaged by the hook member 7 and thus prevented from accidental displacement. It is to be understood that by unscrewing the nut 9 and accordingly relieving the spring 10 of its compression, that each of the blades 12, 13 and 14 may be readily adjusted longitudinally of the corresponding arms 2, 3 and 4 respectively. It is to be understood that the blades 12, 13 and 14 may be graduated with any desired scale of measurement. We further provide a ring-shaped section 16, which is disposed between the arms 2 and 4 and rigidly connected to the same near their ends by means of the projections 17 and 18 respectively. The ring-shaped section 16 is provided upon one side thereof with a circular groove or cut-out portion 19, for the reception of a reduced edge 20 of a circular plate 21. The circular plate 21 is capable of being rotated within the ring-shaped section 16 and is prevented from leaving the same by means of a clamping screw 22 and a flat headed screw 23, the clamping screw 22 and the flat headed screw 23 being arranged preferably diametrically of the ring-shaped section 16. The clamping screw further serves as a means for locking the circular plate 21 in a desired position to the ring-shaped section 16. The circular plate 21 is provided upon one side thereof with a relatively thick section of material 24, which is provided with a groove 25. It is to be understood that the thick section 24 extends laterally beyond the ring shaped section 16, so that a graduated blade 26 may be inserted within the groove 25, and said blade rests upon the ring-shaped section 16. The blade 26 is also provided with a longitudinal groove 27, within which the free end of a hook member 28 fits. The hook member 28 is mounted to move transversely of the section 24 and is held in frictional engagement with the blade 26 by means of the coil spring 29. The coil spring 29 is arranged within an opening formed upon the section 24 and is compressed between a shoulder 30 and a thumb nut 31 which is screw threaded upon one end of the hook member 28. The blade 26 is thus held from displacement and may be adjusted longitudinally and clamped in such adjusted position. The ring-shaped section 16 is provided with a pointer or line 32 which is adapted to coöperate with a scale 33 formed upon the circular plate 21. As before stated, the circular plate 21 may be rotated within the ring-shaped section 16 and it is thus obvious that the blade 26 may be oscillated to assume different angles with relation to the blade 12. The pointer 32 and the scale 33 serving to designate the angle at which the blade 26 is arranged with relation to the blade 12. It is thus seen that our device may be used as a protractor.

Having fully described our invention, what we claim is:—

1. A device of the character described, comprising arms arranged at right angles to each other, an arm arranged at an angle of 45 degrees to one of said arms, blades mounted upon said arms and adapted to be moved longitudinally thereof, means connected to said arms for rotatably supporting a blade, said blade being adapted to be arranged at different angles to one of said arms, and means for clamping said last named blade at a desired angle to the last named arm.

2. A device of the character described, comprising arms arranged at right angles to each other, an arm at an angle of 45 degrees to one of said arms, said arms being provided with longitudinal grooves, blades arranged within said grooves and adapted to be adjusted longitudinally of said arms, means for clamping said blades to said arms, a ring-shaped section rigidly connected to the free ends of two of said arms, a plate rotatably mounted upon said ring-shaped section, a blade longitudinally movably mounted upon said plate, said ring-shaped section being provided with a pointer and said plate being provided with a scale for ascertaining the angle at which said last named blade is arranged.

In testimony whereof we affix our signatures in presence of two witnesses.

GEORGE HENNIGAR.
ROY TENEYCK.

Witnesses:
Wm. Hennigar,
T. K. Jeffreys.